United States Patent [19]

Hipfl et al.

[11] Patent Number: 4,800,730

[45] Date of Patent: Jan. 31, 1989

[54] ARRANGEMENT FOR INFLUENCING THE SPEED OF A COMPRESSOR OF A REFRIGERATING SYSTEM

[75] Inventors: Wolfgang E. Hipfl, Wolfsberg, Austria; Hermut Lamm, Neuhausen/Filder, Fed. Rep. of Germany; Günter Pöschl, Schwaikheim, Austria

[73] Assignee: Suetrak Transportkaelte GmbH, Fed. Rep. of Germany

[21] Appl. No.: 846,459

[22] PCT Filed: Jul. 15, 1985

[86] PCT No.: PCT/EP85/00350

§ 371 Date: Mar. 27, 1986

§ 102(e) Date: Mar. 27, 1986

[87] PCT Pub. No.: WO86/00690

PCT Pub. Date: Jan. 30, 1986

[30] Foreign Application Priority Data

Jul. 16, 1984 [DE] Fed. Rep. of Germany ....... 3426190

[51] Int. Cl.[4] .............................................. F25B 27.00
[52] U.S. Cl. .................................. 62/228.3; 62/323.4
[58] Field of Search ................. 62/323.4, 228.3, 228.4, 62/215, 226

[56] References Cited

U.S. PATENT DOCUMENTS

| 942,499 | 12/1909 | Heinrich | 62/226 |
|---|---|---|---|
| 2,130,995 | 9/1938 | Henney | 62/228.4 X |
| 2,151,987 | 3/1939 | Perrine | . |
| 2,227,257 | 12/1940 | Henney et al. | . |
| 2,320,432 | 6/1943 | Henney | 62/228.4 X |
| 2,626,506 | 1/1953 | Dickieson, Jr. | 62/323.4 X |
| 2,720,087 | 10/1955 | Groene | . |
| 3,220,211 | 11/1965 | Nordguest | . |
| 3,365,906 | 1/1968 | Zadig | 62/226 |

FOREIGN PATENT DOCUMENTS

| 2738728 | 3/1979 | Fed. Rep. of Germany . |
| 3142544 | 6/1982 | Fed. Rep. of Germany . |
| 3230813 | 2/1984 | Fed. Rep. of Germany . |
| 46-9092 | 5/1966 | Japan .................................... 62/226 |
| 55-63141 | 5/1980 | Japan . |

OTHER PUBLICATIONS

Lehrbuch der Kältetechnik, pp. 268 ff.
Konstruieren von Getrieben, pp. 242 ff.

Primary Examiner—William E. Wayner
Attorney, Agent, or Firm—William H. Eilberg

[57] ABSTRACT

The V-belt drive (30, 32) between a drive engine (M) and the compressor (10) is constructed as V-belt drive of infinitely variable transmission ratio having at least one cone pulley pair (20). Connected to the evaporator (14) is a pressure line (24) via which the pressure from the evaporator acts directly on an actuating drive (22) associated with the cone pulley pair (20), whereby said drive adjusts the cone pulleys of the cone pulley pair proportionally to changes of the pressure and thus adjusts the speed of the compressor (10) so that the pressure in the evaporator (14) is kept constant. The arrangement is suitable in particular for use in the refrigerating system of motor vehicles, for example for refrigerating and air-conditioning purposes.

6 Claims, 5 Drawing Sheets

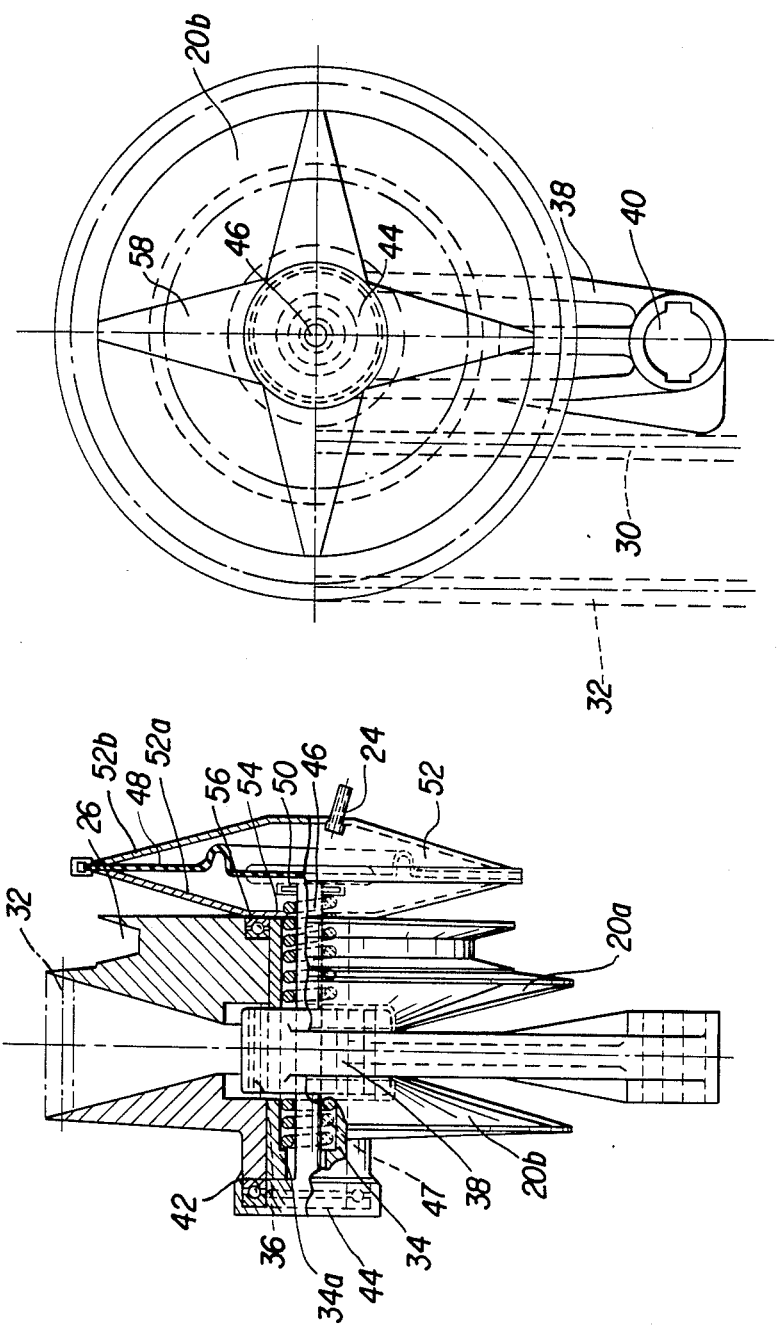

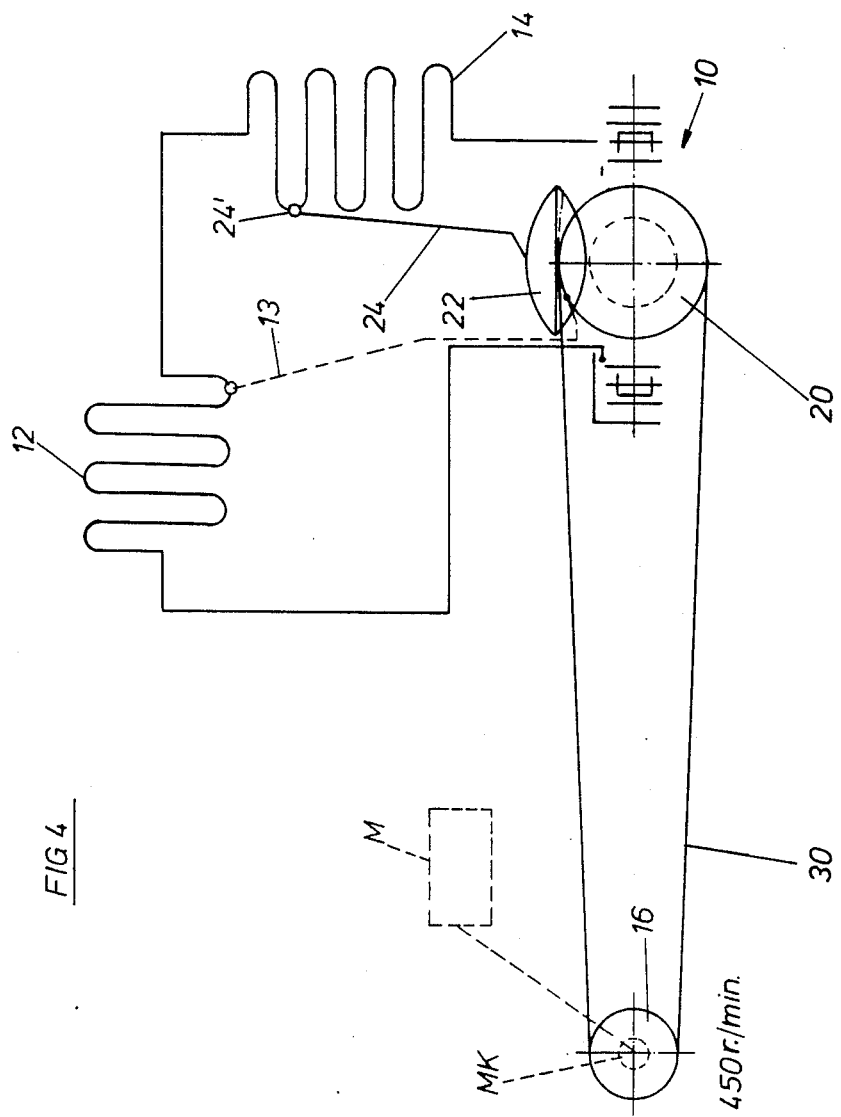

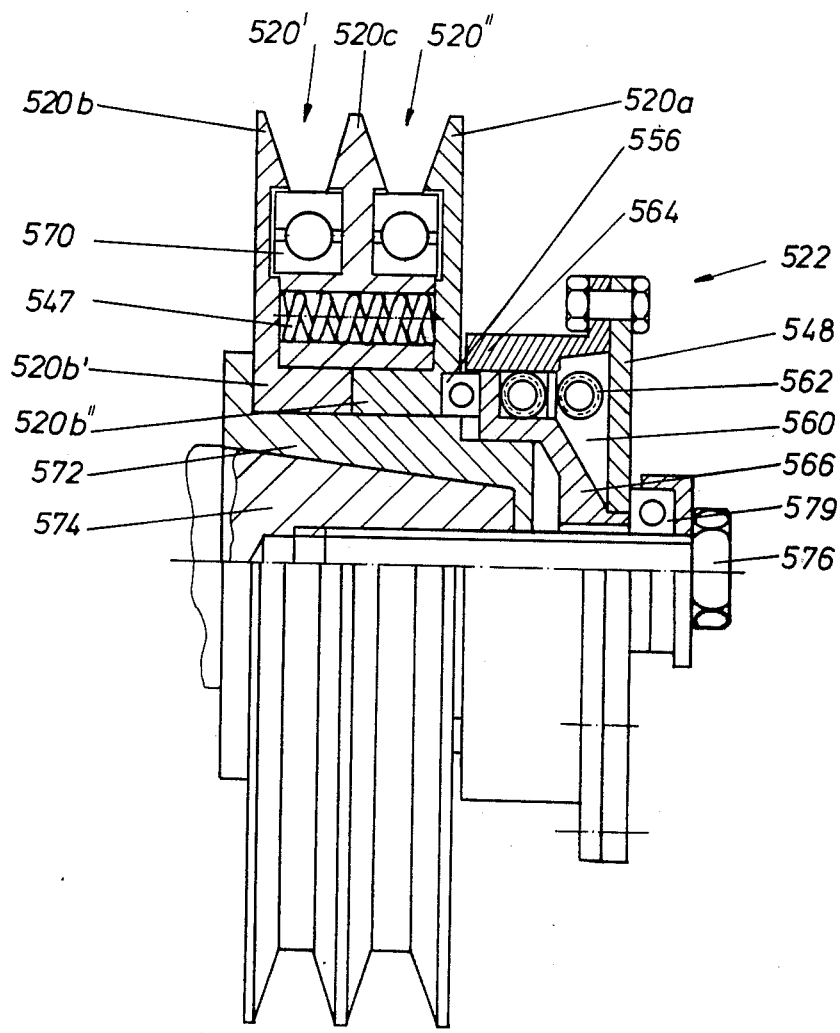

ARRANGEMENT FOR INFLUENCING THE SPEED OF A COMPRESSOR OF A REFRIGERATING SYSTEM

FIELD OF THE INVENTION

The invention relates to an arrangement of the type set forth in the preamble of claim 1.

BACKGROUND OF THE INVENTION

In refrigerating systems as used in motor vehicles, for example in refrigerated vehicles or in the air-conditioning systems of omnibuses or automobiles, the compressor is generally driven by the internal combustion engine provided for driving the motor vehicle. With these internal combustion engines in travelling operation very different speeds occur which can lie in a range of for example 450 r.p.m. to 10000 r.p.m. To ensure that the refrigerating power of the refrigerating system remains substantially constant, however, the speed of the compressor should vary as little as possible. A usual nominal speed of the compressor is for example 2400 r.p.m. The changes in the speeds are particularly great in the case of internal combustion engines of omnibuses travelling from one bus stop to the next so that in them the speed varies continuously over the entire range. In this case in the prior art it is hardly possible to design an air-conditioning system which is optimally constructed for the air-conditioning of the bus. In the case of refrigerated vehicles in the prior art even a separate drive motor running with a constant speed is used for the drive of the compressor because a constant compressor speed cannot be achieved via the internal combustion engine provided for the drive of the refrigerated vehicle. However, the use of a separate drive motor for the compressor is expensive and uneconomical because the vehicle must carry an additional motor whose additional weight decreases the efficiency of the vehicle. Usually, such a separate drive motor for the compressor is also an internal combustion engine. Alternatively, however, electrical generators have already been used which are coupled to the drive internal combustion engine and supply an electric motor with current via an appropriate control in such a manner that said electric motor drives the compressor with a constant speed. This known arrangement for influencing the speed of a compressor of a refrigerating system is however even more expensive than that previously described because it involves more outlay and because the electrical generator must be designed for the entire range of the speed of the internal combustion engine, i.e. must practically be considerably overdimensioned.

To avoid these disadvantages of the arrangements described for influencing the speed of rotation of a compressor in a further known arrangement a magnetic slip coupling is simply used which couples one of the V-belt pulleys of the V-belt drive of the compressor to the associated shaft of the internal combustion engine provided for the drive of the vehicle or of the compressor. The V-belt drive has a fixed transmission ratio, the speed of the internal combustion engine is measured and from a certain nominal speed of the compressor onwards the latter is uncoupled by the magnetic coupling. The magnetic coupling then operates from the nominal speed onwards with slip and as a result high thermal stresses occur in the magnetic coupling and frequently lead to failure of such magnetic couplings. A further disadvantage is that the compressor is driven beneath the nominal speed with the variable speed of the internal combustion engine, i.e. cannot provide a constant delivery. Operation of the compressor with a speed below its nominal speed involves a further disadvantage because with decreasing compressor speed less refrigerant is taken from the evaporator by the compressor and in the extreme case this can lead to the evaporator being flooded, i.e. filling with liquid refrigerant. Since liquid is not compressible to avoid destruction of the compressor the latter must be made substantially larger than really necessary. This involves further additional weight, which is fundamentally unfavourable in motor vehicles.

Moreover, these known arrangements influence the speed of the compressor of the refrigerating system only in dependence upon the speed of the drive internal combustion engine. It is assumed that a certain compressor speed corresponds to a certain refrigerating power and consequently the latter can be kept constant by keeping the compressor speed constant. This simplifying assumption disregards that the pressure within the evaporator also greatly depends on the ambient temperature. The fact that with each ambient temperature a quite definite refrigerant pressure in the evaporator is associated is not taken into account in the known arrangements when the latter influence the compressor speed only in dependence upon the drive internal combustion engine speed.

In a known arrangement of the type set forth in the preamble of claim 1 (DE No. 27 38 728 A1) the refrigerating power of a refrigerating compressor is to be controlled in order to better utilize the power capacity of the refrigerating compressor with decreasing temperatures with the aim of a constant mass throughput. This known control arrangement is based on the knowledge that when with decreasing temperatures the required refrigerating power decreases said refrigerating power of the refrigerating compressor can be controlled via the speed of the electric motor driving it with the aid of the control arrangement in such a manner that with decreasing temperature and decreasing mass throughput of the refrigerant per stroke by increasing the speed of the electric motor the mass throughput can be increased again. However, in this manner the refrigerating power of the refrigerating system is not regulatable because with further decreasing temperature of the refrigerant in the evaporator the energy content of said refrigerant also decreases and certainly cannot be increased by increasing the mass throughput. Consequently, this known arrangement is at the most suitable for a heat pump but not for the refrigerating system of an air-conditioning system. Morevoer, this known arrangement requires a drive motor whose speed must be influenced for the control. There would be no control possibility if the speed of the drive motor changed arbitrarily.

SUMMARY OF THE INVENTION

The problem underlying the invention is to further develop an arrangement of the type set forth in the preamble of claim 1 in such a manner that even with varying speed of the drive motor the refrigerating power of the refrigerating system remains substantially constant.

This problem is solved by the features set forth in the characterizing clause of claim 1.

In the arrangement according to the invention the speed of the compressor of the refrigerating system is influenced in dependence upon the refrigerating power of the evaporator. If for example the compressor runs with nominal speed and the speed of the motor driving it increases the compressor speed also increases so that the delivery volume of the compressor becomes greater. The evaporator contains a certain amount of refrigerant in vapour form and this amount of refrigerant represents a certain pressure associated with the refrigerant. Since by the now greater delivery volume more refrigerant vapour is taken from the evaporator the pressure in said evaporator drops. The pressure at the conduit from the evaporator thus also becomes smaller and the actuating drive is actuated proportionally thereto in such a manner that it pushes the cone pulleys of the cone pulley pair further apart. The V-belt running between the latter is thereby given a smaller trajectory and the speed of the compressor is reduced, and vice versa. Since a quite definite pressure is associated with each temperature, in the arrangement according to the invention temperature-dependent pressure changes in the evaporator are also automatically compensated. Thus, in every case on a refrigerant pressure change due to drive engine speed change and/or temperature change the speed of the compressor can be regulated so that the refrigerant pressure in the evaporator is kept constant. Since this speed influencing takes place relatively quickly there is no danger of flooding of the evaporator and consequently the dimensioning of the compressor need lie only insignificantly above its nominal power. The arrangement according to the invention also advantageously responds to ambient temperature changes and adjusts the speed of the compressor even when the speed of the drive engine does not change at all. The refrigerating system can thereby always be held at its optimum refrigerating power which was hitherto considered impossible in such simple manner in transport refrigerating and air-conditioning systems as used in motor vehicles.

Since by the arrangement according to the invention the mass throughput of refrigerant is varied in dependence upon the energy available in the evaporator, the drive power available for this purpose varies proportionally to the amount of energy in the refrigerant cycle so that by reduction of the mass throughput in motor vehicle refrigerating systems a considerable saving of fuel is obtained. This saving of fuel corresponds for example to the energy converted to dissipated heat in the aforementioned magnetic slip coupling when the nominal speed is exceeded.

It is admittedly already known (DE No. 31 42 544 Al) to provide between the drive motor and the compressor of a compressed air system a variable belt drive and to pivot the drive motor in dependence upon the air pressure generated in order to vary the transmission ratio between the drive motor and compressor. This however serves only the purpose of allowing the motor driving the compressor to operate at or in the vicinity of the maximum nominal current during the entire operation of the compressor. For utilizing the maximum nominal capacity the compressor can then compress larger air volumes at lower pressure and the maximum nominal pressure can be reached more rapidly. In this case as well the speed of the drive motor is acted upon and there would be no possibility of control if the drive motor speed changed arbitrarily. In contrast, the arrangement according to the invention has the essential advantage that even with large speed fluctuations of the drive motor the pressure of the gas inspired by the compressor can be kept constant.

In the arrangement according to the invention the V-belt drive between the motor and the compressor is constructed as V-belt drive of infinitely variable transmission ratio with at least one cone pulley pair. Said cone pulley pair can be provided simply on the output shaft of the motor or on the drive shaft of the compressor and all that is then additionally provided is any suitable spring-loaded belt tensioning means (as known for example from FIG. 3 in DE No. 31 42 544) which tensions the belt when the trajectory thereof at the cone pulley pair changes.

The further development of the invention according to claim 2 is particularly suitable for already existing refrigerating systems which are to be subsequently equipped with the arrangement according to the invention. In this case the cone pulley pair is disposed between the motor and the compressor and one of its cone pulleys is driven by the motor with fixed transmission ratio. The cone pulley pair in turn drives with the V-belt running therebetween the compressor with an infinitely variable transmission ratio. The drive shaft of the compressor carries a further cone pulley pair whose cone pulleys are tensioned with respect to each other by means of springs so that when the V-belt tension becomes smaller they are pushed further together and when the V-belt tension becomes larger they are pushed further apart. In the further development of the invention according to claim 5 the further cone pulley pair may be provided with the same actuating drive as the other cone pulley pair.

In the further development of the invention according to claim 8 the actuating drive is constructed simply as diaphragm box which in proportion to pressure changes in the evaporator pushes the cone pulleys of the cone pulley pair together or away from each other.

Examples of embodiment of the invention will be described hereinafter in detail with reference to the drawings, wherein:

BRIEF DESCRIPTION OF THE DRAWINGS

FIG. 2 shows a cone pulley pair used in an embodiment of the arrangement according to the invention with associated actuating drive for infinitely variable transmission ratio adjustment and FIG. 3 is a view along the line III—III of FIG. 2

FIG. 4 shows a further embodiment of the arrangement according to the invention in which the cone pulley pair with associated actuating drive according to FIG. 2 is provided directly on the drive shaft of the compressor and coupled directly to the V-belt pulley of the drive motor, FIG. 5 shows an embodiment of the cone pulley pair as double cone pulley pair and a further embodiment of the actuating drive.

DESCRIPTION OF THE PREFERRED EMBODIMENTS

Figure 1:
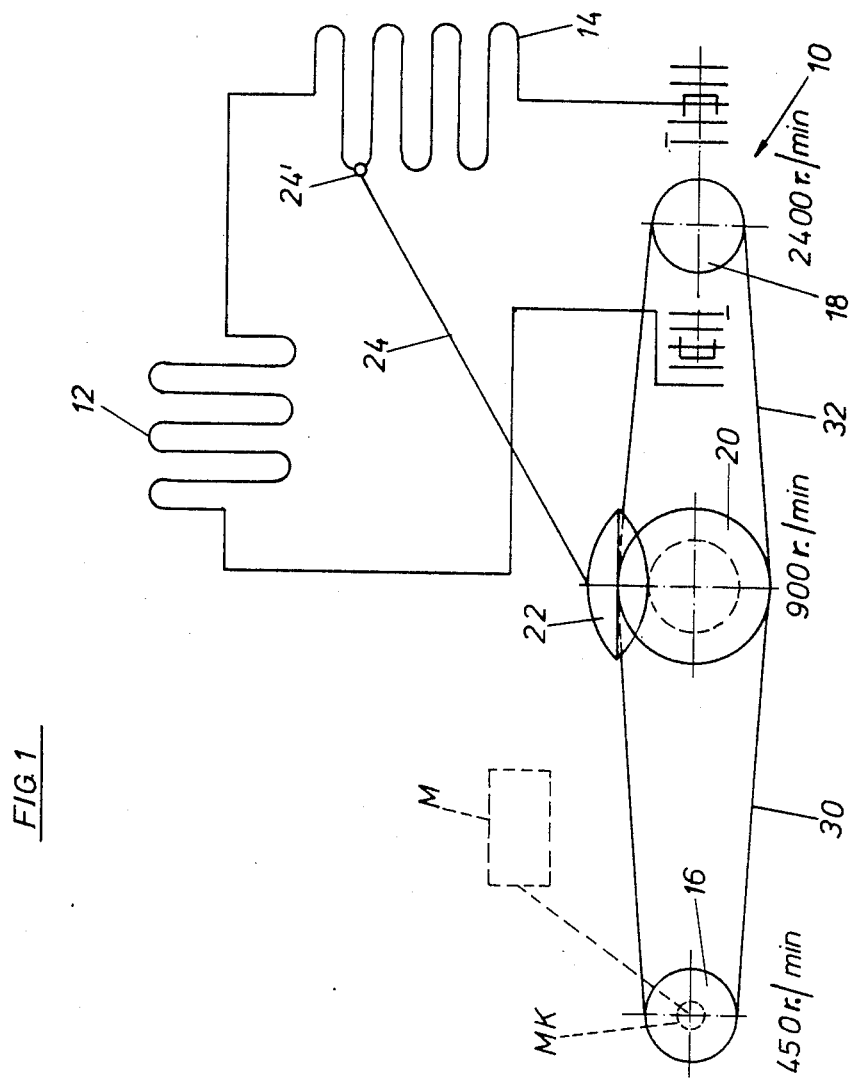
FIG. 1 is a schematic overall view of a refrigerating system comprising an arrangement according to the invention for influencing the speed of a compressor of the refrigerating system.

FIG. 1 shows the overall construction of a refrigerating system of which only the parts essential to the explanation of the invention are shown. The refrigerating system includes in series a compressor 10, a condenser 12 and an evaporator 14. Refrigerant is evaporated in the evaporator 14, the compressor inspires the refrigerant gas forming due to the evaporated refrigerant, compresses it and conducts it to the condenser 12 which returns the liquefied refrigerant to the evaporator 14 again. The example of embodiment described here is a refrigerating system used for refrigerating or air-conditioning purposes in a motor vehicle. The internal combustion engine M provided for the drive of the motor vehicle is only indicated and via a V-belt pulley 16 and a V-belt not illustrated in the conventional case directly drives a V-belt pulley 18 and thus the compressor 10. For the influencing of the speed of the compressor explained at the beginning in the usual case a magnetic slip coupling MK is provided. The transmission ratio of the V-belt drive is fixed in the usual case and the speed influencing is only by actuating the magnetic slip coupling MK.

In the example embodiment of the invention described here the magnetic slip coupling MK is not provided and the V-belt drive between the V-belt pulley 16 and the V-belt pulley 18 is constructed as V-belt drive of infinitely variable transmission ratio. For this purpose between the V-belt pulleys 16 and 18 a cone pulley pair 20 is provided which is rotatably mounted on the engine M or on the frame of the motor vehicle and which can be pushed apart and together by an actuating drive 22 to influence the speed of the compressor. The actuating drive is connected by a pressure line 24 illustrated in FIG. 1 to the evaporator 14 so that the actuating drive is actuated directly in dependence upon the pressure in the evaporator 14, as will be described in more detail hereinafter. The line 24 is connected at a point 24' to the evaporator 14.

According to the illustration of FIG. 2 the cone pulley pair 20 consists of two cone pulleys 20a and 20b. The cone pulley 20a is formed externally by a V-belt groove 26 as belt pulley. The groove 26 receives a V-belt 30 via which the pulley 16 drives the cone pulley 20a. In the example described here the fixed transmission ratio is 1:2. When the cone pulley 16 driven by the engine M rotates at 450 r.p.m. the cone pulley 20a has a speed of 900 r.p.m. Between the cone pulleys 20a, 20b a V-belt 32 is clamped via which the pulley 18 of the compressor 10 is driven.

According to the illustration in FIGS. 2 and 3 the two cone pulleys 20a, 20b are disposed on a common hollow shaft 34 each with sliding fit. The hollow shaft 34 is rotatably mounted in its centre region by means of a needle roller bearing 36 in a bearing bore of a bracket 38 having the form of a connecting rod. The bracket 38 has at its other end a bore 40 for receiving a bolt with which it is secured to the engine M. At the left end of the hollow shaft 34 in FIG. 2 a thrust ball bearing 42 is disposed whose inner race bears on the cone pulley 20b and whose outer race bears on a thrust ring 44 which is fixedly connected to one end of a push rod 46 which is led through the hollow shaft. The outer diameter of the push rod 46 is smaller than the inner diameter of the hollow shaft 34. The push rod has at its left end in FIG. 2 a thread with which it is screwed into a corresponding threaded bore of the thrust ring 44. In the intermediate space formed between the push rod 46 and the hollow shaft 34 a helical pressure spring 47 is disposed. At its right end in FIG. 2 the push rod is fixedly connected to a diaphragm plate 48. The helical pressure spring 47 bears at its left end in FIG. 2 on an inwardly directed collar 34a of the hollow shaft 34 and at the right end on a thrust needle bearing 50 which bears on the other side on the diaphragm plate 48.

The diaphragm plate 48 is clamped at its entire periphery between the halves 52a and 52b of a housing 52 of a diaphragm box. The housing half 52a is provided with a central opening 54 through which the helical pressure spring 47 and the push rod 46 are led and at the periphery of which the housing 52 bears on the outer race of a thrust ball bearing 56 whose inner race bears on the cone pulley 20a. The two housing halves 52a, 52b of the housing 52 are tightly screwed together at the periphery. The housing inner chamber half between the housing half 52a and the diaphragm plate 48 are connected to the outer surroundings via the opening 54 whilst the other housing chamber half is tightly sealed. It is however in connection via the pressure line 24 with the interior of the evaporator 14 so that the diaphragm plate on this side is continuously subjected to the pressure in the evaporator 14. By screwing the push rod 46 to a greater or lesser extent into the threaded bore of the thrust ring 44 the biasing force of the helical pressure spring 47 and thus the biasing force of the diaphragm plate 48 may be adjusted. The diaphragm plate 48 may consist of spring sheet metal or a resilient material resistant to refrigerant. The cone pulleys 20a and 20b are provided on their axially facing sides with cone surfaces laterally inverted with respect to each other between which the V-belt 32 driving the compressor 10 runs.

According to the illustration in FIG. 3 the cone pulley 20b is provided on its side remote from the cone pulley 20a with 4 radial spoke-like ribs 58 between which the cone pulley 20b is recessed. The ribs 58 are so formed that they serve as air conveying vanes to convey air with which the cone pulley 20b is cooled. The cone pulley 20a is provided with corresponding ribs which are not visible in FIGS. 2 and 3.

The arrangement described here for influencing the speed of the compressor 10 operates as follows:

In FIG. 2 the position is shown in which the V-belt 32 is just in its upper position between the cone pulleys 20a and 20b. In this position the compressor 10 runs with its maximum speed (at its nominal speed of 2400 r.p.m. the V-belt 32 would be disposed in a centre position). The force transmission from the engine M is via the V-belt 30 to the cone pulley 20a and via the V-belt 32 clamped between the two cone pulleys 20a and 20b to the pulley 18 of the compressor 10. The V-belt 32 presses outwardly onto the cone pulleys 20a and 20b and thereby entrains them both and in turn they brace themselves on the hollow shaft 34 and entrain the latter. The hollow shaft 34 can rotate because firstly it bears on the thrust ball bearing 44 and secondly it bears rotatably via the helical pressure spring 47 on the thrust needle bearing 50 at the diaphragm plate 48. The diaphragm housing 52 comprises a fixed connection not illustrated to the engine M so that said housing cannot rotate. The biasing force of the helical pressure spring 47 directed to the right in FIG. 2 is opposed by the pressure it the evaporator 14 acting on the other side of the diaphragm plate 48 so that the V-belt 32 at the nominal speed of the compressor 10 retains its centre position, not illustrated, as long as the speed of the engine M and the pressure or the temperature in the evaporator do not change. If the speed of the engine M rises the speed of the compressor 10 also temporarily rises beyond the nominal speed so that it takes from the evaporator more refrigerant gas.

As a result the pressure in the evaporator drops so that the diaphragm plate 48 can move somewhat to the right. The cone pulleys 20a and 20b thereby move apart from each other and the V-belt 32 moves on a smaller trajectory. As a result the speed of the compressor drops, the pressure in the evaporator rises again and the diaphragm plate 48 is again pressed to the left in FIG. 2, the cone pulley 20b moves somewhat towards from the cone pulley 20a and the V-belt 32 again reaches its centre position. The speed of the compressor is correspondingly increased or decreased when the pressure in the evaporator changes by variation of the drive engine speed or of the ambient temperature of the evaporator.

In the example of embodiment illustrated in FIG. 1 the function of the belt tensioning means mentioned above is fulfilled in that the V-belt pulley 18 of the compressor 10 is constructed as cone pulley pair whose cone pulleys are biased with respect to each other by springs (not illustrated). When the V-belt 32 is moved by adjustment of the cone pulleys 20a, 20b to a greater trajectory the springs of the cone pulley pair 18 relax accordingly so that the V-belt 32 therein can run on a somewhat smaller trajectory. The biasing of the springs of the cone pulley pair 18 and the biasing of the helical pressure spring 47 in the cone pulley pair 20 are so chosen that on operation of the actuating drive 22 the desired speed change at the compressor 20 always results.

FIG. 4 shows the same structure of the refrigerating system as in FIG. 1 but with the difference compared to FIG. 1 that the V-belt pulley 18 of the compressor 10 is replaced by the cone pulley pair 20 with associated actuating drive 22. In this example of embodiment the actuating drive 22 comprises a further pressure line 13 via which it is connected to the condenser 12 for the purpose explained in detail below. The actuating drive according to FIG. 4 contains two chambers which are connected to the lines 13 and 24 respectively.

FIG. 5 shows an embodiment in which a plurality of cone pulley pairs 520', 520" are connected in parallel in that between the outer cone pulleys 520a, 520b a common cone pulley 520c is disposed. The use of a plurality of cone pulley pairs 520', 520", etc., is preferred for transmitting greater torques.

The example of embodiment shown in FIG. 5 additionally shows a further embodiment of the actuating drive 522 which could have the construction shown in FIG. 2 but in the present case does not serve to control the speed of the compressor but only to stop the compressor. This relates to a case in which the speed of the compressor is not stopped but by means of the actuating drive the compressor is only connected to the V-belt 30 in force-locking manner or said drive connection is interrupted by the actuating drive 522. In the example of embodiment shown in FIG. 5 the actuating drive 522 comprises a chamber 560 which is filled with silicone and in which a two-course tube coil 562 is disposed which bears axially outwardly on a plate 548 corresponding to the diaphragm plate 48 and axially inwardly on a bell-shaped displaceable wall 566 which is displaceable with respect to the plate 548 and a guide ring 564 fixedly connected thereto. The wall 566 bears on the other side on the thrust ball bearing 556 corresponding to the thrust ball bearing 56 according to FIG. 2. The plate 548 bears axially outwardly on a radial ball bearing 549 which on the other hand in the manner illustrated in FIG. 5 (screw 576, compressor crankshaft journal 574) has a fixed connection to the cone pulley 520b. Instead of the helical pressure spring 47 in the embodiment according to FIG. 5 a plurality of helical pressure springs 547 is provided which are disposed in axial bores of the centre cone pulley 520c and bear at their ends on the inner surfaces of the cone pulleys 520a, 520b. Between the cone pulleys 520a, b, c beneath the two V-belts not illustrated ball-mounted races 570 are provided which are disposed with interference fit on the centre cone pulley 520c and on the freely rotatable outer races of which the V-belt can lie when the cone pulleys 520a, 520b are in their position remote from the centre cone pulley 520c. In the embodiment of FIG. 2 the upper peripheral surface of the bracket 38 (which is preferably polished) fulfils the purpose of the races 570.

In the embodiment of FIG. 5 the tube coil 562 is connected via the line 13 (FIG. 4) to the condenser 12 (or generally to a compressed air source). If as mentioned the speed of the compressor 10 need not be controlled and therefore the embodiment of the actuating drive according to FIG. 5 is used, due to the interior pressure present in the tube coil 562 the actuating drive 522 presses the cone pulleys 520a, 520b together against the force of the helical springs 547. When the pressure action ceases (for example by decreasing pressure in the condenser 12 or by disconnection of the compressed air source) the springs 547 push the cone pulleys 520a, 520b apart, the compressor thereby being stopped.

In the embodiment illustrated in FIG. 5 the cone pulleys 520a, 520b, 520c are each connected to their shafts in form-locking manner by a polygonal or multi-wedge profile, the inner cone pulley 520c to its shaft in the form of flanges 520b' and 520b" of the outer cone pulleys 520a, 520b and the latter via these flanges to a bush 572 which is connected in the manner illustrated (conical seat and wedge connection) to the compressor crankshaft journal 574.

Figure 6:
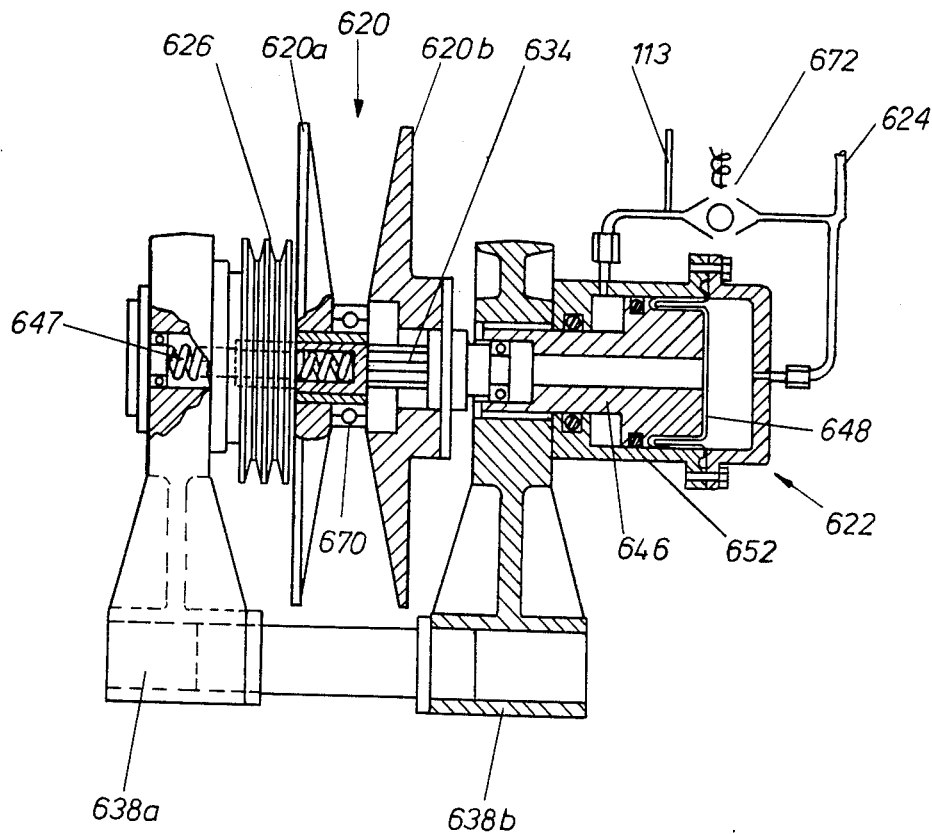
FIG. 6 shows a further embodiment of the cone pulley pair and a further embodiment of the actuating drive.

FIG. 6 shows an embodiment of the cone pulley pair 620 modified with respect to the illustration of FIG. 2. In this embodiment the bracket according to FIG. 2 is replaced by two brackets 638a, 638b between which the cone pulley pair 620 is rotatably mounted. The double cone pulley 626 corresponds to the cone pulley represented in FIG. 2 by the V-belt groove 26. A ball bearing 670 mounted on a collar of the cone pulley 620b fulfils the same purpose as the races 570 in the embodiment according to FIG. 5. Instead of the force-locking connection described with reference to FIG. 2 between the cone pulley pair 20 and the hollow shaft 34 in the embodiment of FIG. 6 a form-locking connection is provided by a multi-wedge profile on the outside of the hollow shaft 634. The helical pressure spring 647 is engaged between the left bracket 638a and the bottom of the bore of the hollow shaft 634. The hollow shaft 634 is fixedly connected to the right cone pulley 620a. The hollow shaft 634 is axially displaceably mounted in the left cone pulley 620b. The cone pulley 620b is rotatably mounted on the bracket 638a and is not axially displaceable.

In FIG. 6 further to the right a further embodiment of the actuating drive 622 is illustrated in which instead of the diaphragm box according to FIG. 2 a diaphragm cylinder is provided which comprises a housing 652 in which a roll diaphragm 648 is secured which covers a piston 646 which is displaceable in the housing 652. At the left end of the piston 646 the cone pulley 620a is secured for relative rotation. The cone pulley 620a and the piston 646 are not displaceable axially relatively to each other, i.e the cone pulley 620a excecutes every movement of the piston 646 in the axial direction as well. The housing 652 is connected via a line 624 corresponding to the line 24 to the evaporator 14 (FIG. 1). The arrangement described here is identical in its mode of operation to that of FIG. 2.

The piston 646 can be subjected to pressure via a further line 113 connected to the housing 652. The line 113 leads either to the condensor 12 (corresponding to the line 13 of FIG. 4) or generally to a compressed air source. The two lines 113 and 624 are connectable together by an AND/OR check valve, preferably a magnetic check valve 672. When the compressor is to be switched off the left side of the piston 646 is subjected to pressure via the line 113. In this case the ball symbolically illustrated in the magnetic check valve 672 is in its right position and blocks the connection to the line 624. When the refrigerating system is started the compressor first remains uncoupled by the pressure in the line 113. Then the ball in the magnetic check valve 672 is brought into the centre position illustrated. Since the effective area of the piston 646 on the right side (roll diaphragm 648) is greater, the piston is moved to the left. The V-belt drive thus engages (the cone pulleys 620a, 620b are moved towards each other) and finally the ball in the magnetic check valve 672 moves to the left in front of left opening. The further control operation then takes place as in the embodiment of FIG. 2.

We claim:

1. Arrangement for influencing the speed of a compressor for regulating the refrigerating power of a refrigerating system which includes a condenser and an evaporator, the compressor being drivable by an engine undergoing abrupt speed variations independent of the load on the refrigerating system, and the refrigerant volume throughput being influenceable in the compressor in dependence upon the refrigerant pressure on the suction side of the compressor, characterized in that the engine (M) is coupled to the compressor (10) by a V-belt drive of infinitely variable transmission ratio and comprising at least one cone pulley pair (20, 520', 520'', 620) which is adapted to be pushed apart and together, and that there is associated with the cone pulley pair (20, 520', 520'', 620) an actuating drive (22, 522, 622) which is subjected via a line (24) connected to the evaporator (14) to the refrigerant pressure in said evaporator and adjusts the cone pulleys (20a, 20b; 520a, 520c; 620a, 620b) of the cone pulley pair proportionally to changes of the refrigerant pressure directly by the action of said refrigerant pressure, said actuating drive (622) is constructed as a diaphragm cylinder including a piston (646) which moves toward and away from one of the cone pulleys (620b) of the cone pulley pair (620) and the piston (646) of which displaceable therein is connected on the one side to the other cone pulley (620a) for relative rotation but not relative axial displacement and on the other side is subjected via the line (624) connected to the cylinder and the evaporator (14) to the line refrigerant pressure in the evaporator.

2. Arrangement according to claim 1, characterized in that the piston (646) is subjected to pressure on the one side via a further line (113) connected to the cylinder and a pressure source.

3. Arrangement according to claim 2, characterized in that the pressure source is a compressed air source.

4. Arrangement according to claim 3, characterized in that the two lines (113,624) are adapted to be connected together by an AND/OR check valve (672).

5. Arrangement according to claim 2, characterized in that the two lines (113,624) are connected together by an AND/OR check valve (672).

6. Arrangement according to claim 2, characterized in that the pressure source is the condenser (12).

* * * * *